(12) United States Patent
Reichert et al.

(10) Patent No.: US 9,858,283 B2
(45) Date of Patent: *Jan. 2, 2018

(54) METHOD FOR EN PASSANT WORKLOAD SHIFT DETECTION

(71) Applicant: International Business Machines Corporation, Armonk, NY (US)

(72) Inventors: Michael Reichert, Hildrizhausen (DE); Torsten Steinbach, Holzgerlingen (DE); Matthias Tschaffler, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/625,650

(22) Filed: Feb. 19, 2015

(65) Prior Publication Data

US 2016/0246839 A1 Aug. 25, 2016

(51) Int. Cl.
*G06F 17/30* (2006.01)
*G06F 11/34* (2006.01)
*G06F 11/30* (2006.01)

(52) U.S. Cl.
CPC .... *G06F 17/30144* (2013.01); *G06F 11/3034* (2013.01); *G06F 11/3414* (2013.01); *G06F 17/30433* (2013.01); *G06F 17/30463* (2013.01); *G06F 17/30469* (2013.01); *G06F 17/30474* (2013.01); *G06F 17/30595* (2013.01)

(58) Field of Classification Search
USPC .................................................. 707/607, 718
See application file for complete search history.

(56) References Cited

U.S. PATENT DOCUMENTS

| | | | |
|---|---|---|---|
| 7,499,908 | B2 | 3/2009 | Elnaffar et al. |
| 7,657,501 | B1 | 2/2010 | Brown et al. |
| 8,176,037 | B2 | 5/2012 | Yu |
| 8,484,242 | B1 | 7/2013 | Singh et al. |
| 8,543,554 | B1 | 9/2013 | Singh et al. |
| 8,555,288 | B2 | 10/2013 | Brown et al. |
| 8,763,091 | B1 | 6/2014 | Singh et al. |
| 2009/0210445 | A1 | 8/2009 | Draese et al. |
| 2010/0083264 | A1 | 4/2010 | Mehta et al. |
| 2011/0022586 | A1 | 1/2011 | Wilkinson et al. |

OTHER PUBLICATIONS

Mohammad A. Munawar et al. "Monitoring Multi-tier Clustered Systems With Invariant Metric Relationships", May 2008.*

(Continued)

*Primary Examiner* — Hung T Vy
(74) *Attorney, Agent, or Firm* — Michael O'Keefe

(57) ABSTRACT

Embodiments of the present invention provide systems, methods, and computer program products for detecting shifts in types of workloads handled by a relational database management system. Embodiments of the present invention can afford relational database administrators with the ability to leverage information pertinent to the current type of workload being handled by the relational database management system. Furthermore, embodiments of the present invention provide relational database administrators with information in regard to system workload states and workload transitions.

11 Claims, 6 Drawing Sheets

(56) References Cited

OTHER PUBLICATIONS

Elnaffar, Said, S., "A Methodology for Auto-recognizing DBMS Workloads", School of Computing, Queen's University Kingston, ON K7L 3N6 Canada, pp. 1-15, © Copyright IBM Canada Ltd., 2002.

Elnaffar et al., "Automatically Classifying Database Workloads", CIKM'02, Nov. 4-9, 2002, McLean, Virginia, USA, pp. 1-3, Copyright 2002 ACM 1-58113-492-4/02/0011.

Holze et al., "Autonomic Databases: Detection of Workload Shifts with n-Gram Models", pp. 127-142, "Advances in Databases and Information Systems", Lecture notes in Computer Science vol. 5207, 2008, Copyright Springer-Verlag, Berlin Heidelberg 2008, DOI 10.1007/978-3-540-85713-6_10, <http://rd.springer.com/chapter/10.1007%2F978-3-540-85713-6_10>.

Holze et al., Towards Workload Shift Detection and Prediction for Autonomic Databases, PIKM'07, Nov. 9, 2007, Lisboa, Portugal, pp. 109-116, Copyright 2007 ACM 978-1-59593-832-9/07/0011, <http://dl.acm.org/citation.cfm?id=1316892>.

PCTi, "DSLB™—Database SQL Load Balancer", provided by inventors on Jan. 5, 2015, Copyright © 2015 Parallel Computers Technology, Inc., <http://www.pcticorp.com/products.php?page=dslb-sql-load-balancer>.

ScaleArc, "The ScaleArc Technology", provided by inventors on Jan. 5, 2015, Copyright 2015 ScaleArc, <http://scalearc.com/how-it-works/technology>.

IBM: List of IBM Patents or Patent Applications Treated as Related (Appendix P), Feb. 8, 2016, pp. 1-2.

Pending U.S. Appl. No. 15/040,009, filed Feb. 10, 2016, titled"Method for En Passant Workload Shift Detection," pp. 1-32.

\* cited by examiner

METHOD FOR EN PASSANT WORKLOAD SHIFT DETECTION

BACKGROUND OF THE INVENTION

The present invention relates generally to the field of monitoring information retrieval systems, and more particularly to detecting workload demands and types of workloads.

Relational database administrators (RDBAs) need to be aware of different types of workloads that are processed by a relational database management system (RDBMS). Automatic detection of shifts in types of workloads is important because it informs an RDBA with information needed to effectively allocate RDBMS resources to meet different types of workload demands.

Typically, a workload classification mechanism requires a learning phase, where an RDBA monitors RDBMS performance metrics and records the performance metrics with the current known type of workload. This procedure can be time and resource-intensive. Furthermore, the workload classification mechanism may not be able to detect a shift if the RDBMS is handling a type of workload that was not introduced to the RDBMS during the learning phase.

SUMMARY

Embodiments of the present invention provide systems, methods, and computer program products for detecting changes in a type of workload processed by a relational database management system. In one embodiment, a method is provided comprising; monitoring, by one or more computer processors, a plurality of workloads processed by the database management system in a first monitoring interval and a second monitoring interval; detecting, by one or more computer processors, a change in a type of workload for a first and second monitoring interval; and responsive to detecting the change in the type of workload for the first and second monitoring interval, identifying, by one or more computer processors, the type of workload in the second monitoring interval based, at least in part, on one or more time invariant metrics.

DETAILED DESCRIPTION

Embodiments of the present invention provide systems, methods, and computer program products for monitoring relational database management systems (RDBMS). Embodiments of the present invention can help determine shifts in types of workloads handled by an RDBMS. Furthermore, embodiments of the present invention may be used to provide relational database administrators (RDBA) of the RDBMS with workload information without requiring any prior training or a learning phase. For example, an RDBA may employ embodiments of the present invention to detect shifts in types of workloads that are processed by an RDBMS during a processing operation, as well as identify specific types of workloads, scale up or scale down workloads, etc. The term "workload," as used herein, refers to a set of requests (e.g., SQL statements such as, 'SELECT,' 'INSERT,' 'DELETE,' and 'UPDATE') to be executed by an RDBMS. Furthermore, each type of workload may consume a varying amount of computational resources. Accordingly, types of workloads can have different time invariant metrics (e.g., plan hash codes, overall abstract costs, etc.) and can be used to help determine shifts in types of workloads handled by the RDBMS.

Figure 1:
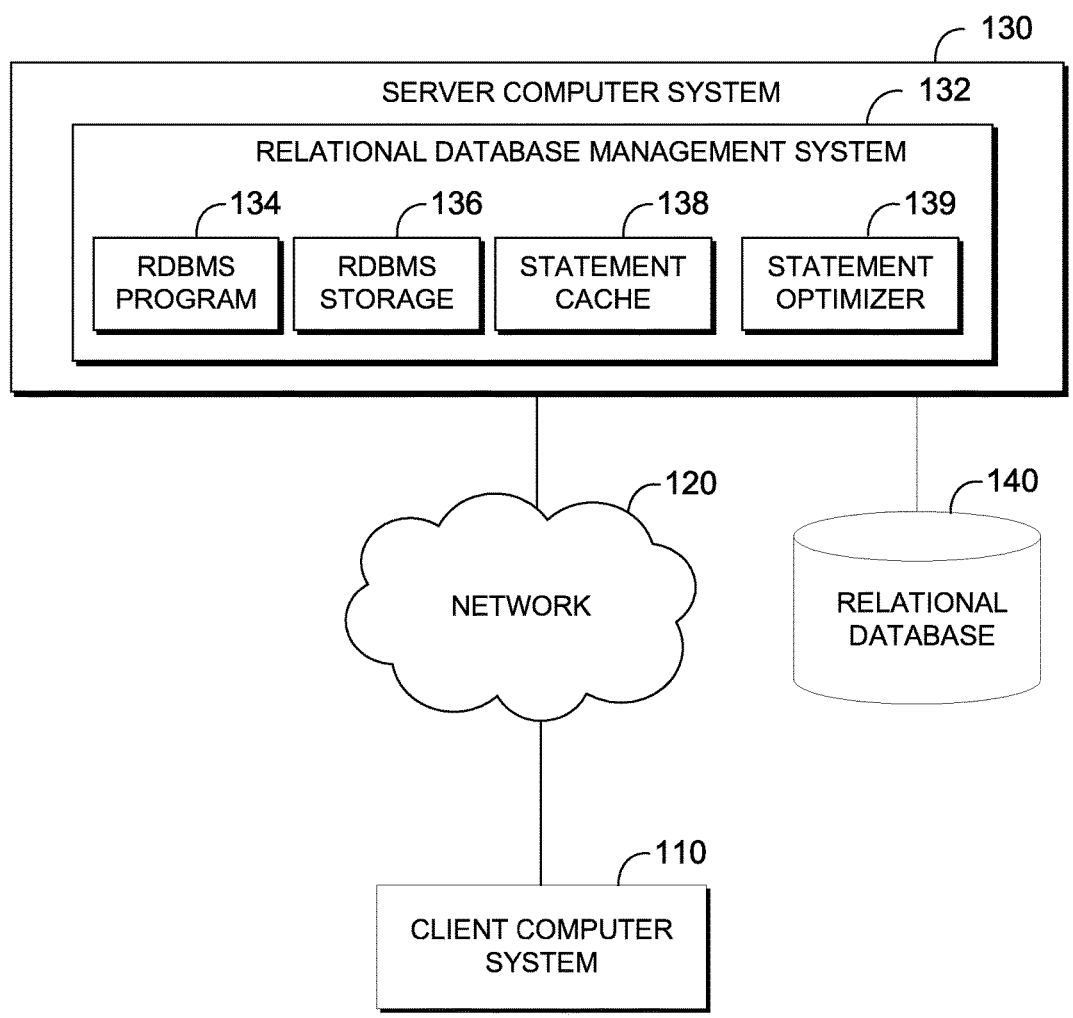
FIG. 1 is a block diagram of a computing environment, in accordance with an embodiment of the present invention.

FIG. 1 is a block diagram of a computing environment 100, in accordance with an embodiment of the present invention. Computing environment 100 includes client computer system 110, server computer system 130, and relational database 140, all interconnected by network 120. Client computer system 110 and server computer system 130 can be desktop computers, laptop computers, specialized computer servers, or any other computer systems known in the art. In certain embodiments, client computer system 110 and server computer system 130 represent computer systems utilizing clustered computers and components to act as a single pool of seamless resources when accessed through network 120. For example, such embodiments may be used in data center, cloud computing, storage area network (SAN), and network attached storage (NAS) applications. In certain embodiments, client computer system 110 and server computer system 130 represent virtual machines. In general, client computer system 110 and server computer system 130 are representative of any electronic device, or combination of electronic devices, capable of executing machine-readable program instructions, as discussed in greater detail with regard to FIG. 5.

Server computer system 130 includes relational database management system 132. Relational database management system 132, and components therein, controls reading, writing, modifying, and processing information stored in relational database 140. Relational database management system 132 manages relational database 140 and may process different types of workloads. For example, a financial institution may rapidly execute several transactions for a processing operation. The term, "processing operation", as used herein, refers to a duration of time for server computer system 130 to process statements (i.e., execute statements). The transaction may require relational database management system 132 to process a specific type of workload (e.g., Online Transactional Processing, 'OLTP'). In this instance, the financial institution can issue financial reports and aggregate financial information, which may require a different type of workload (e.g., Online Analytical Processing, 'OLAP'). In this embodiment, relational database management system 132 processes at least two different types of workloads (e.g., OLTP and OLAP). Although not depicted, in other embodiments, server computer system 130 contains relational database 140.

In this embodiment, relational database management system 132 includes RDBMS program 134, RDBMS storage 136, statement cache 138, and statement optimizer 139. Although not depicted, in other embodiments, RDBMS program 134, RDBMS storage 136, statement cache 138, or statement optimizer 139 can be located in components of computing environment 100, separate from server computer system 130.

Statement optimizer 139 determines an optimal access plan for a statement, and relational database management system 132 processes (i.e., executes) the statement, in accordance with the optimal access plan for the statement. The term "access plan," as used herein, refers to the number of operations or ordered steps used to access information in a relational database. To determine an optimal access plan for a statement, statement optimizer 139 may determine a plurality of access plans for a statement. Furthermore, statement optimizer 139 can calculate an access plan cost for each of the plurality access plans. Accordingly, the optimal access plan can refer to an access plan with the lowest access plan cost. The term, "access plan cost," as used herein, represents an amount of resources required to execute a statement, in accordance with an associated access plan. For example, the statement optimizer of IBM DB2 for Linux, Unix, and Windows uses 'timerons' to represent an access plan cost for an associated access plan. In other embodiments, statement optimizer 139 can use other methods to quantify and represent access plan costs (e.g., QUINTS, which is a single number that sums the total cost of each query based on CPU processing and the CPU time associated with all I/O processing). In this embodiment, statement optimizer 139 stores information pertinent to statement execution in statement cache 138 after a statement is processed, in accordance with an optimal access plan. Furthermore, the information pertinent to the statement execution is updated with each re-execution of the statement. Statement optimizer 139 can also store each access plan for each executed statement in statement cache 138.

RDBMS storage 136 stores information (e.g., performance information, identifiers for previously identified workloads, identifiers for previously identified types of workloads, other time invariant metrics, etc.) pertinent to an operation of relational database management system 132. RDBMS storage 136 contains a library comprising information pertinent to previously identified workloads. In certain instances, RDBMS program 134 accesses the library to determine if a detected workload matches a previously identified type of workload, as described in greater detail with regard to FIG. 3.

Statement cache 138 contains access plans and access plan costs that correspond to statements executed during a processing operation. In this embodiment, statement cache 138 is implemented by relational database management system 132 to reduce an amount of computational resources required for processing a statement. In this embodiment, RDBMS program 134 caches executed statements, corresponding access plans, and the access plan costs in statement cache 138. In this embodiment, statement cache 138 contains a dynamic statement cache and a static statement cache. Although not depicted, in another embodiment, statement cache 138 is contained within RDBMS storage 136.

Relational database 140 is a relational database that is managed by relational database management system 134. Relational database 140 can be implemented using any relational database architecture and any storage media known in the art.

It should be understood that, for illustrative purposes, FIG. 1 does not show other computer systems and elements which may be present when implementing embodiments of the present invention. For example, while FIG. 1 shows a single client computer system 110 and relational database 140, computing environment 100 can include additional client computer systems 110 that access multiple relational databases 140 that are managed by one or more server computer systems 130.

Figure 2:
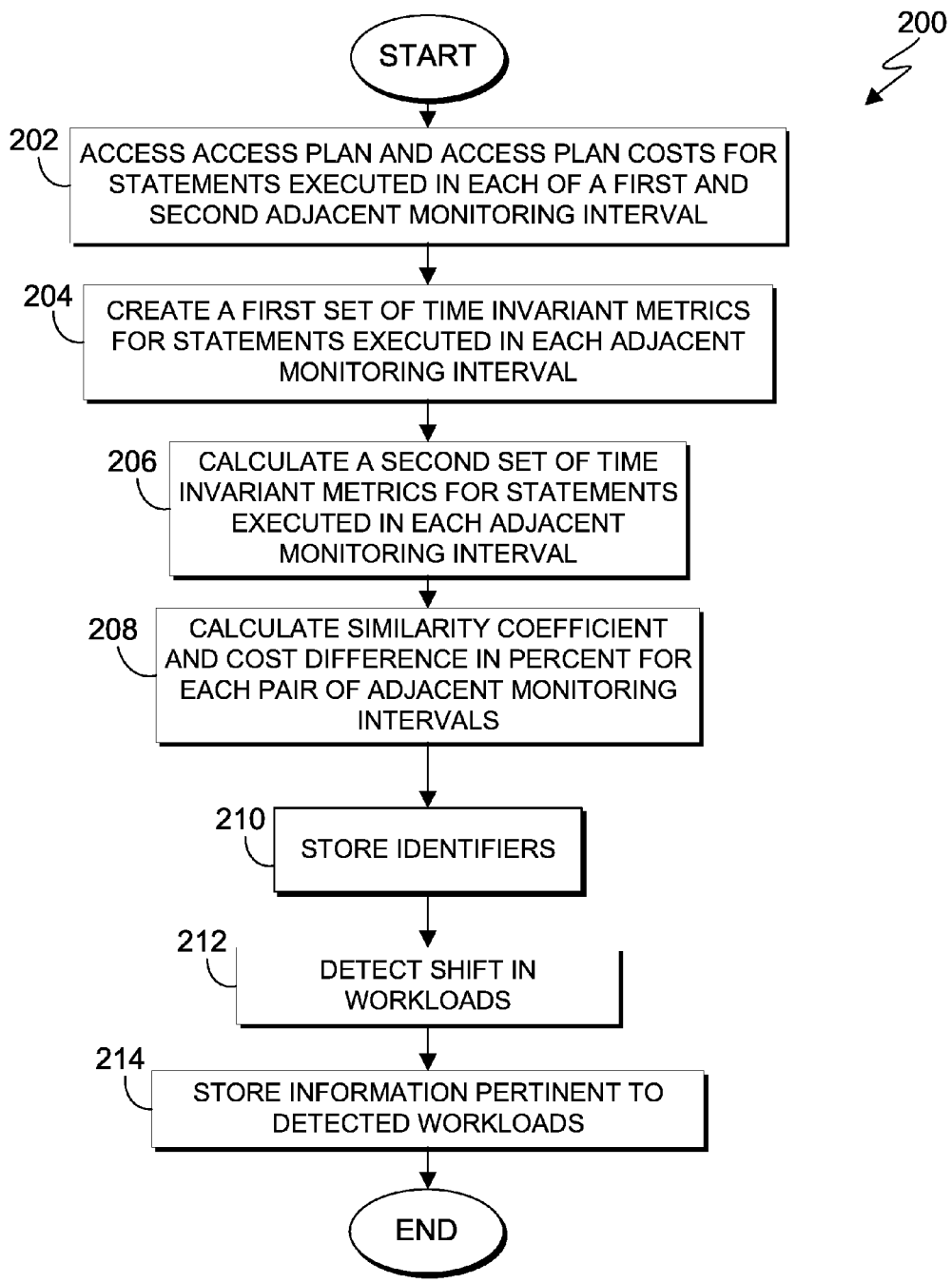
FIG. 2 is a flowchart illustrating operational steps for detecting a shift in workload in a pair of adjacent monitoring intervals, in accordance with an embodiment of the present invention.

FIG. 2 is a flowchart 200 illustrating operational steps for detecting a type of workload in adjacent monitoring intervals, in accordance with an embodiment of the present invention. In this embodiment, detecting a type of workload can help detect a possible shift in a type of workload. The phrase, "monitoring interval," as used herein, refers to a duration of time wherein RDBMS program 134 is monitoring the performance of relational database management system 132. For example, a start time of a monitoring interval may be indicated by $t_{n-1}$ minutes, and an end time may be indicated by $t_n$ minutes. Accordingly, adjacent monitoring intervals refer to two consecutive monitoring intervals (i.e., one monitoring interval immediately following the other). For example, adjacent monitoring intervals may include a first monitoring interval, $[t_{n-1}$ to $t_n]$, and a second monitoring interval, $[t_n$ to $t_{n+1}]$. Furthermore, an RDBA may require monitoring for an entire processing operation for server computer system 130. In this instance, the RDBA may use a plurality of adjacent monitoring intervals, such that a total duration of time for the plurality of adjacent monitoring intervals equates to a total duration of time for the processing operation. For example, a total duration of time for the processing operation of relational database management system 132 can be $t_{n+2}$ minutes. In this instance, the RDBMS program 134 may use a plurality of adjacent monitoring intervals to monitor the performance of relational database management system 132 (e.g., a first monitoring interval, $[t_{n-1}$ to $t_n]$, a second monitoring interval, $[t_n$ to $t_{n+1}]$, and a third monitoring interval $[t_{n+1}$ to $t_{n+2}]$). In another example, the RDBA can adjust the length of each of the plurality of adjacent monitoring intervals, such that a total duration of time for the plurality of adjacent monitoring intervals equates to a total duration of time for the processing operation. It should be understood that an adjacent monitoring interval may comprise multiple types of workloads, and the ability to detect shifts in workloads may depend on the length of each adjacent monitoring interval. For example, if there are six types of workloads processed in two adjacent monitoring intervals, then individual changes for each of the six types of workloads processed in the two adjacent monitoring intervals may not be apparent. Accordingly, if a duration of time is reduced for each adjacent monitoring interval (i.e., $t_n$ minutes reduced to $t_n/2$ minutes for each adjacent monitoring interval), such that there are a greater plurality of adjacent monitoring intervals that can describe an entire processing operation, then there is a greater probability of each adjacent monitoring interval comprising one type of workload. Stated differently, an RDBA may specify shorter adjacent monitoring intervals to increase granularity in detecting shifts in workloads for adjacent monitoring intervals. In this embodiment, RDBMS program 134 of relational database management system 132 transmits information between RDBMS storage 136 and statement cache 138 to detect shifts in types of workloads in adjacent monitoring intervals. In another embodiment, a dedicated monitoring program may be implemented to monitor the performance of relational database management system 132 instead of RDBMS program 134, as well as transmit information between RDBMS storage 136 and statement cache 138. In this instance, the dedicated monitoring program may maintain its own storage (e.g., library, etc.) to store information about workloads.

In step 202, RDBMS program 134 accesses an access plan and access plan costs for statements executed in each of a first and second adjacent monitoring interval. In this embodiment, RDBMS program 134 monitors statement cache 138 to access previously executed statements, the access plans, and the access plan costs. For example, RDBMS program 134 may monitor statement cache 138 to access statements executed in the first adjacent monitoring interval. In this instance, five statements may be executed in the first monitoring interval, wherein each of the five statements executed in the first monitoring interval corresponds to a unique access plan and associated access plan cost. Furthermore, three statements may be executed in the second monitoring interval, wherein each of the three statements executed in the second monitoring interval corresponds to unique access plans and associated access plan costs.

In step 204, RDBMS program 134 creates a first set of time invariant metrics for statements executed in each adjacent monitoring interval. In this embodiment, RDBMS program 134 creates access plan hash codes, '$P(t_n)$', (as the first set of time invariant metrics) from the access plans for statements executed in each adjacent monitoring interval. For example, five access plans may correspond to five statements executed in the first adjacent monitoring interval. In this instance, RDBMS program 134 uses the five access plans to create five access plan hash codes for statements executed in the first adjacent monitoring interval. In this embodiment, RDBMS program 134 creates an access plan hash code from an access plan (e.g., an optimal access plan), such that each statement corresponds to a unique access plan hash code. Typically, implementing access plan hash codes can provide a less resource intensive way to compare access plans that can be interpreted as statement identifiers. In this embodiment, RDBMS program 134 creates the access plan hash code values using a hash function (e.g., calculating a Fowler-Noll-Vo code for a string representation of a statement's access plan) to determine if two statement instances are identical or not. In this embodiment, RDBMS program 134 stores the first set of time invariant metrics (i.e., access plan hash codes for each statement) in RDBMS storage 136 for each adjacent monitoring interval. Stated differently, for a first adjacent monitoring interval, RDBMS program 134 may store statements executed in the first adjacent monitoring interval and a first set of time invariant metrics for those statements in RDBMS storage 136. Furthermore, for a second adjacent monitoring interval, RDBMS program 134 may store statements executed in the second monitoring interval and a first set of time invariant metrics for those statements in RDBMS storage 136. Accordingly, each access plan hash code is a unique identifier for an individual statement, regardless of when the individual statement was executed in a particular adjacent monitoring interval.

In step 206, RDBMS program 134 calculates a second set of time invariant metrics for statements executed in each adjacent monitoring interval. RDBMS program 134 calculates a second set of time invariant metrics from the access plan costs for statements executed in each adjacent monitoring interval. In this embodiment, the second set of time invariant metrics in each adjacent monitoring interval comprises an overall abstract plan cost, '$C(t_n)$'. In this instance, RDBMS program 134 may calculate the second set of time invariant metrics by summing of all access plan costs for every statement executed in an adjacent monitoring interval, '$c_i$'. For example, if statement 1 has access plan cost c(1), and statement 1 is executed five times, then statement 1 contributes 5*c(1) to the overall abstract plan cost. Accordingly, the overall abstract workload cost (i.e., a second set of time invariant metrics) can be calculated by: $C(t_n) = SUM(c_i)$, and represents the total access cost for all statements executed in an adjacent monitoring interval. In this embodiment, RDBMS program 134 stores each overall abstract workload cost for each adjacent monitoring interval in RDBMS storage 136. Accordingly, RDBMS storage 136 may contain information for an adjacent monitoring interval comprising statements executed in the adjacent monitoring interval, the access plans, the access plan costs, a first set of time invariant metrics (e.g., access plan hash codes), and a second set of time invariant metrics (e.g., an overall abstract workload cost).

In step 208, RDBMS program 134 calculates a similarity coefficient, '$S(t_i)$,' and a cost difference in percent value, '$X(t_i)$,' for each pair of adjacent monitoring intervals. In this embodiment, the similarity coefficient for a pair of adjacent monitoring intervals represents the similarity of a first set of time invariant metrics (e.g., statement identifiers, such as access plan hash codes) in a first adjacent monitoring interval of the pair to a first set of time invariant metrics of the second adjacent monitoring interval. For example, RDBMS program 134 can use access plan hash codes for a first adjacent monitoring interval in a pair of adjacent monitoring intervals (e.g., $P(t_{n-1})$) and the second adjacent monitoring interval (e.g., $P(t)$) to calculate the similarity coefficient for the pair of adjacent monitoring intervals, $S(t_i)$, wherein the similarity coefficient comprises a value ranging from 0 to 1. This value, ranging from 0 to 1, can be interpreted also as a probability that two first sets of time invariant metrics are similar. In this embodiment, RDBMS program 134 calculates a similarity coefficient for a pair of two adjacent monitoring intervals using any method known in the art (e.g., Jaccard Indicies, Sorencen-Dice coefficients, etc.). Furthermore, it should be understood that calculating similarity coefficients using access plan hash codes can be performed by comparing access plan hash codes of a first adjacent monitoring interval to access plan hash codes of a second adjacent monitoring interval. Subsequently, a ratio (e.g., Jaccard Index) can be calculated that describes the number of access plan hash codes present in both the first and second adjacent monitoring interval divided by the total number of access plan hash codes present in both the first and second adjacent monitoring intervals.

In this embodiment, RDBMS program 134 also calculates the cost difference in percent values for the two adjacent monitoring intervals, wherein the cost difference in percent provides a metric to quantify how much workload costs have changed from the first adjacent monitoring interval compared to the second adjacent monitoring interval. Furthermore, the cost difference in percent may help determine scale-up or scale-down of a type of workload, as discussed in greater detail with regard to FIG. 3. In this embodiment, RDBMS program 134 stores the similarity coefficient and the cost difference in percent RDBMS storage 136. Accordingly, RDBMS storage 136 may contain information for the pair of adjacent monitoring intervals comprising statements executed in each of the adjacent monitoring intervals, the access plans, the access plan costs, a first set of time invariant metrics (i.e., access plan hash codes), a second set of time invariant metrics (i.e., two overall abstract workload costs), two identifiers for adjacent monitoring intervals, a similarity coefficient, and a cost difference in percent.

In step 210, RDBMS program 134 stores an identifier for each adjacent monitoring interval. For example, a workload identifier can be represented by a set of attributes or tags.

In step 212, RDBMS program 134 detects a shift in a workload between each of a pair of adjacent monitoring intervals. In this embodiment, RDBMS program 134 uses a similarity coefficient and a cost difference in percent for a pair of adjacent monitoring intervals to detect a shift in a workload during the pair of adjacent monitoring intervals. An overall abstract workload cost is required to determine a cost difference in percent and, as previously discussed, the overall abstract workload cost can be calculated by: $C(t_n)$ =SUM($c_i$), and represents the total access cost for all statements executed in an adjacent monitoring interval. In this embodiment, RDBMS program 134 accesses a set of specified conditions for a similarity coefficient and cost difference in percent from RDBMS storage 136. For example, a set of specified conditions for a similarity coefficient to detect a shift in a type of workload for an adjacent monitoring interval may comprise:

1. $S(t_i)<0.5$ (i.e., the similarity coefficient is low); or
2. $S(t_i)>=0.8$ (i.e., the similarity coefficient is high), but the workload costs, [$C(t_{n-1})$ and $C(t_n)$] have significantly changed between the two adjacent monitoring intervals. An increase greater than 20% or a decrease greater than 20% results in a significant change.

In this embodiment, if one of the two above-mentioned conditions is true, then RDBMS program 134 detects a shift in a type of workload between each of the pair of adjacent monitoring intervals. Conversely, if neither of the two above-mentioned conditions are true, then RDBMS program 134 does not detect a shift in a type of workload between each of the pair of adjacent monitoring intervals. For example, RDBMS program 134 may determine a similarity coefficient, $S(t_n)>=0.8$, for two adjacent monitoring intervals. In this instance, RDBMS program 134 determines whether workload costs have significantly changed between the two adjacent monitoring intervals. In this instance, RDBMS program 134 may determine the overall abstract workload costs has not significantly changed (i.e., the cost difference in percent does not hold the set of specified conditions true). Accordingly, the RDBMS program 134 does not detect a shift in a type of workload during the pair of adjacent monitoring intervals. Furthermore, RDBMS program 134 continues to detect workloads being processed between two adjacent monitoring intervals. For example, an RDBA may require detection of shifts of workloads for an entire processing operation for relational database management system 132, wherein the processing operation may comprise four pairs of adjacent monitoring intervals. In this instance, RDBMS program 134 detects shifts in workloads for each of the four pairs of adjacent monitoring intervals.

In step 214, RDBMS program 134 stores information pertinent to the detected shift in workloads in RDBMS storage 136.

Figure 3:
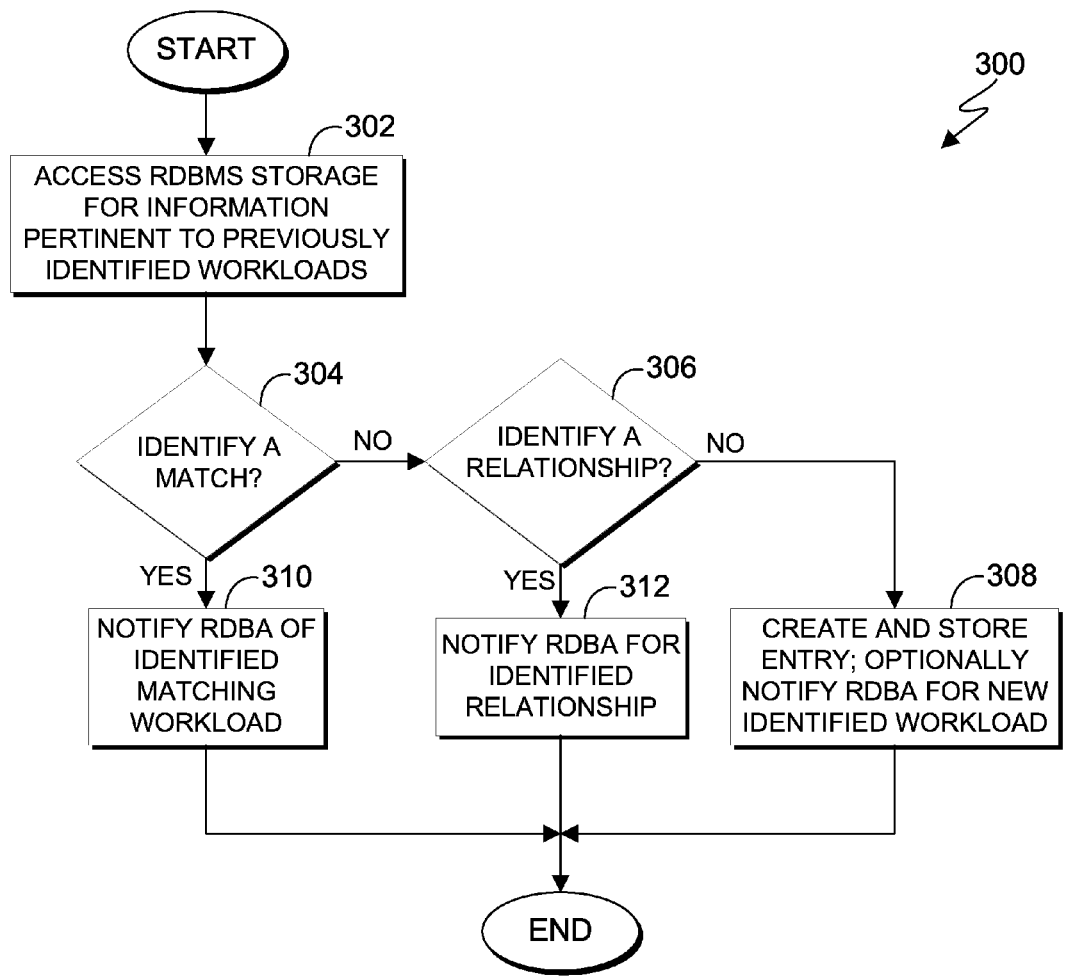
FIG. 3 is a flowchart illustrating operational steps for identifying a type of workload, in accordance with an embodiment of the present invention.

FIG. 3 is a flowchart 300 illustrating operational steps for identifying a type of workload, in accordance with an embodiment of the present invention. In this embodiment, identifying a type of workload occurs after RDBMS program 134 detects a shift in a type of workload and stores information pertinent to shifts in workloads in RDBMS storage 136, as described in FIG. 2. For illustrative purposes, FIG. 3 describes operational steps for identifying a type of workload in a pair of adjacent monitoring intervals. It should be understood that operational steps described in FIG. 3 can be performed for each pair of adjacent monitoring intervals.

In step 302, RDBMS program 134 accesses RDBMS storage 136 for information pertinent to previously identified workloads. In this embodiment, RDBMS program 134 accesses entries in a library that stores the information pertinent to previously identified workloads in RDBMS storage 136.

In step 304, RDBMS program 134 determines whether a type of workload is identified. RDBMS program 134 identifies a type of workload based on whether two workloads (e.g., the detected workload and the previously identified workload) match. In this embodiment, a match for two workloads may constitute which two workloads that have high similarity and minor differences (i.e., for a set of adjacent monitoring intervals $S(t)>0.95$ and $X(t)<5\%$). In other embodiments, an RDBA may specify the criteria for matching workloads. In this embodiment, RDBMS program 134 accesses information pertinent to a detected workload to compare with information pertinent to previously identified types of workloads. For example, RDBMS program 134 determines that two workloads are matching if the two workloads are similar (e.g., $S(t)>0.95$) with respect to access plan hash codes, and if the cost difference is small (e.g., $X(t)<5\%$). In this instance, RDBMS program 134 may iteratively compare information pertinent to previously identified types of workloads stored in entries of a library with information pertinent to the detected type of workload until a match is identified, or until all entries of the library in RDBMS storage 136 have been compared.

If in step 304, RDBMS program 134 determines that a type of workload is identified, then in step 310, RDBMS program 134 notifies an RDBA of the identified matching type of workload. RDBMS program 134 may notify an RDBA about the identified matching type of workload in several ways. In this embodiment, RDBMS program 134 alerts the RDBA about the current relational database state (i.e., a new matching type of workload). In another embodiment, RDBMS program 134 updates an entry in the library containing the previously identified type of workload that matches the detected workload to include information pertinent to the identified matching type of workload. In yet another embodiment, RDBMS program 134 logs the identified matching type of workload in RDBMS storage 136. In this instance, an RDBA may access RDBMS storage 136 to manually retrieve information pertinent to the matching type of workload.

If in step 304, RDBMS program 134 determines that a type of workload is not identified, then in step 306, RDBMS program 134 determines whether a relationship of the detected workload is identified. In this embodiment, a relationship of a detected workload may be a scale-up or scale-down version of a previously identified type of workload. For example, RDBMS program 134 may identify relationships by using time invariant metrics for the detected workload and time invariant metrics for the previously identified type of workload to calculate a cost difference in percent. Furthermore, the cost difference in percent, $X(t_i)$, with respect to the detected workload, $W_{detected}$, and the previously identified type of workload, $W_{identified}$, may indicate a scale up or scale down by fulfilling a set specified of conditions (e.g., $X(t_i)<80\%$ or $X(t_i)>120\%$), where $X(t_i)=[100*C(t_{detected})]/C(t_{identified})$.

If, in step 306, RDBMS program 134 determines that a relationship of the detected workload is identified, then in step 312, RDBMS program 134 notifies an RDBA of the newly identified relationship. In this embodiment, RDBMS program 134 may provide several ways to notify an RDBA with information in regard to relationships of the detected workload (i.e., scale-ups or scale-downs). In this embodiment, RDBMS program 134 alerts the RDBA about the new workload relationship (i.e., a scale-up or scale-down workload). In another embodiment, RDBMS program 134 updates an entry in the library containing the previously identified type of workload that has a relationship with the detected workload to include information pertinent to the detected workload already existing in the library of RDBMS storage 136. In yet another embodiment, RDBMS program 134 logs the identified relationship in RDBMS storage 136. In this instance, an RDBA may access RDBMS storage 136 to manually retrieve information pertinent to the relationship. In another embodiment, RDBMS program 134 provides a graphical representation of relationships in types of workloads to an RDBA. For example, RDBMS program 134 may provide a time series diagram, similar to that of FIG. 5A. Furthermore, RDBMS program 134 may provide a transition diagram (e.g., a finite state diagram) that illustrates which workloads are processed, and information regarding which workload transitions took place, as shown in FIG. 4B.

If, in step 306, RDBMS program 134 determines that a relationship of the detected workload is not identified, then in step 308, RDBMS program 134 creates an entry in the library and stores information pertinent to a newly identified type of workload. In this embodiment, RDBMS program 134 assigns a new identifier to a detected workload to create a newly identified type of workload. In another embodiment, an RDBA may manually modify the new identifier to reflect a type of workload of the newly identified type of workload. In this embodiment, RDBMS program 134 optionally notifies an RDBA of the newly identified type of workload. In another embodiment, RDBMS program 134 stores information pertinent to the newly identified type of workload in RDBMS storage 136. In this instance, an RDBA may access RDBMS storage 136 to manually retrieve information pertinent to the newly identified type of workload.

EXAMPLE

Figure 4A:
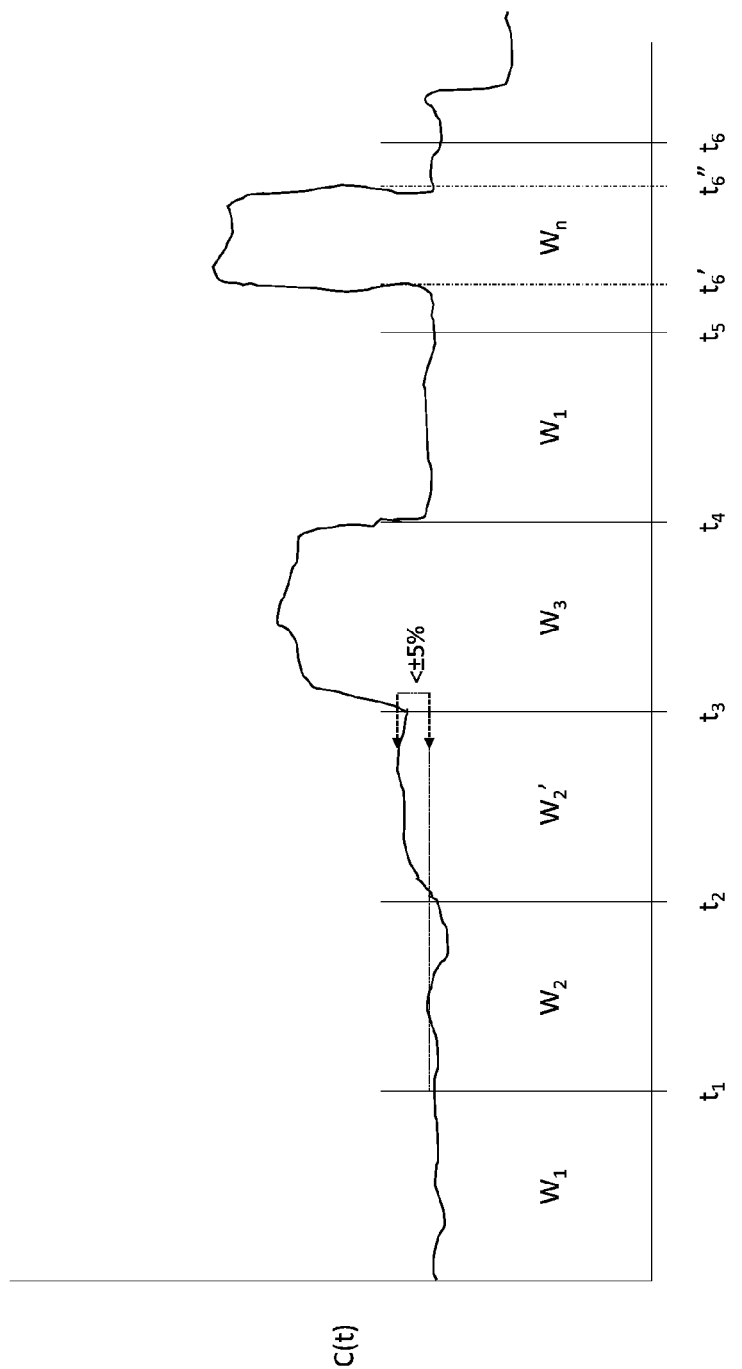
FIGS. 4A and 4B are diagrams illustrating workloads processed by the computing environment during a processing interval, in accordance with an embodiment of the present invention.
Figure 4B:
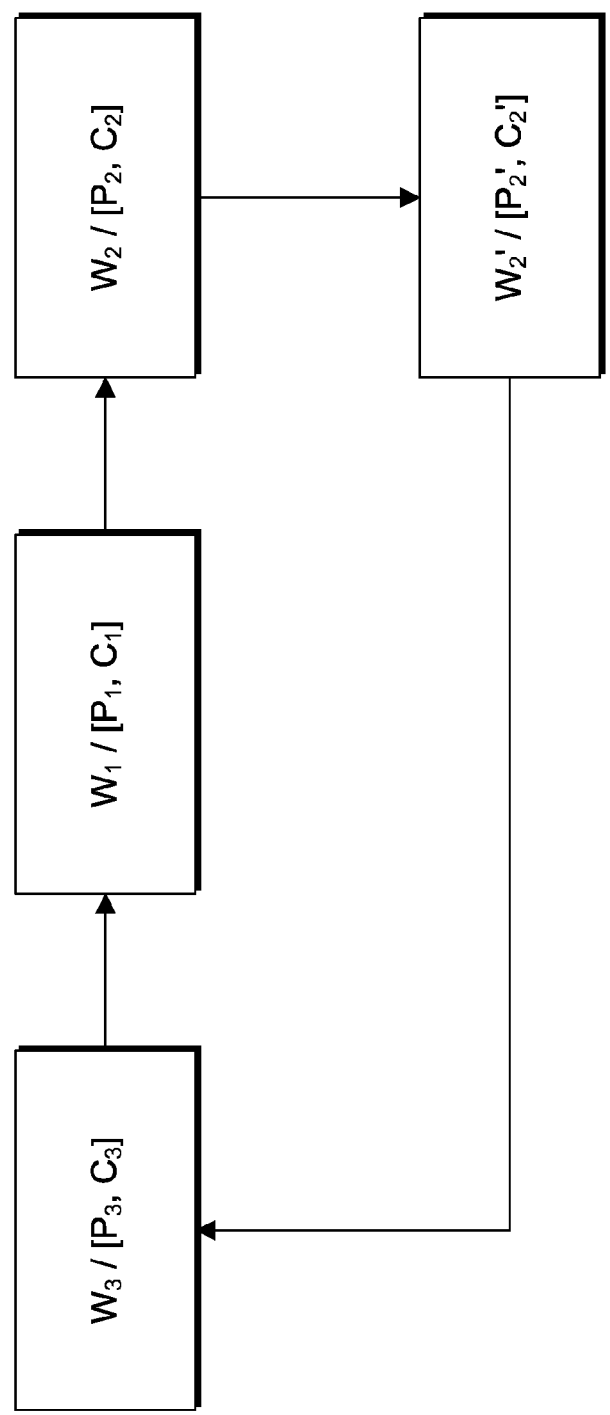

FIG. 4A provides an illustrative example for workloads processed by computing environment 100 during a processing interval (e.g., t0 to t6 time units). In this embodiment, each monitoring interval is indicated by vertical lines segmenting the x-axis. For example, a first monitoring interval is from 0 to t1 time units, a second monitoring interval is from t1 to t2 time units, a third monitoring interval is from t2 to t3 time units and so on and so forth. In this embodiment, the y-axis represents overall abstract plan costs for statements executed in each monitoring interval.

In this embodiment, the first monitoring interval comprises a workload, W1. Furthermore, the second monitoring interval comprises a workload, W2. In this embodiment, W1 and W2 exhibit similar overall abstract plan costs, but embodiments of the present invention detect a shift in workload. Accordingly, embodiments of the present invention utilize the operational steps described in FIG. 2 to determine that a shift in workload has been detected between the first and second monitoring interval.

In this embodiment, the third monitoring interval comprises workload, W2'. Furthermore, embodiments of the present invention determine that W2 and W2' share a relationship. In this embodiment, embodiments of the present invention perform operational steps described in FIG. 3 to identify the type of relationship between W2 and W2' is a scale up. For example, FIG. 4A depicts a comparison between W2 and W2', showing that the scale up relationship is within 5% of an overall abstract plan cost difference in percent.

In this embodiment, the fourth monitoring interval comprises workload, W3. Furthermore, embodiments of the present invention detect a shift in workload by performing operational steps described in FIG. 2. In this embodiment, the fourth interval handles a relatively demanding workload (indicated by the increased overall access plan cost). For example, during the fourth interval, a query may be received by an OLAP system to return a response comprising aggregate financial information. In this instance, financial information may have been transmitted by an OLTP system throughout prior monitoring intervals and aggregated in the OLAP system. Stated differently, W1, W2, and W2' represent an OLTP workload and W3 represents an OLAP workload.

In this embodiment, the fifth monitoring interval comprises workload, W1. Accordingly, embodiments of the present invention may handle the same time of workload multiple times throughout a processing interval. In this embodiment, the sixth monitoring intervals illustrate comprise workload, Wn. Furthermore, embodiments of the present invention may determine that Wn is W1 based on performing operational steps described in FIGS. 2 and 3. In this embodiment, the sixth monitoring interval illustrates a sharp increase in overall abstract workload cost, and subsequently illustrates a sharp decrease at the end of the sixth monitoring interval. An administrative user may specify smaller monitoring intervals to more accurately detect workload shifts in the sixth monitoring interval. In FIG. 4A, t6' and t6" help illustrate smaller monitoring intervals that enable embodiments of the present invention to detect a workload shift in the sixth monitoring interval.

FIG. 4B provides an illustrative example for workloads processed by computing environment 100 during a processing interval, in accordance with an embodiment of the present invention. In this embodiment, FIG. 4B represents a finite state diagram which provides an RDBA with information pertinent to which workloads have been processed and which transitions took place. For example, workload W1 is processed during the processing interval, and then the type of workload changes to workload W2. Workload W2 undergoes a change in computational activity (i.e., a scale-up/scale-down) resulting in workload W2'. Workload W3 is processed during the processing interval, transitioning from workload W2'. Then, the type of workload transitions from workload W3 to workload W1.

Figure 5:
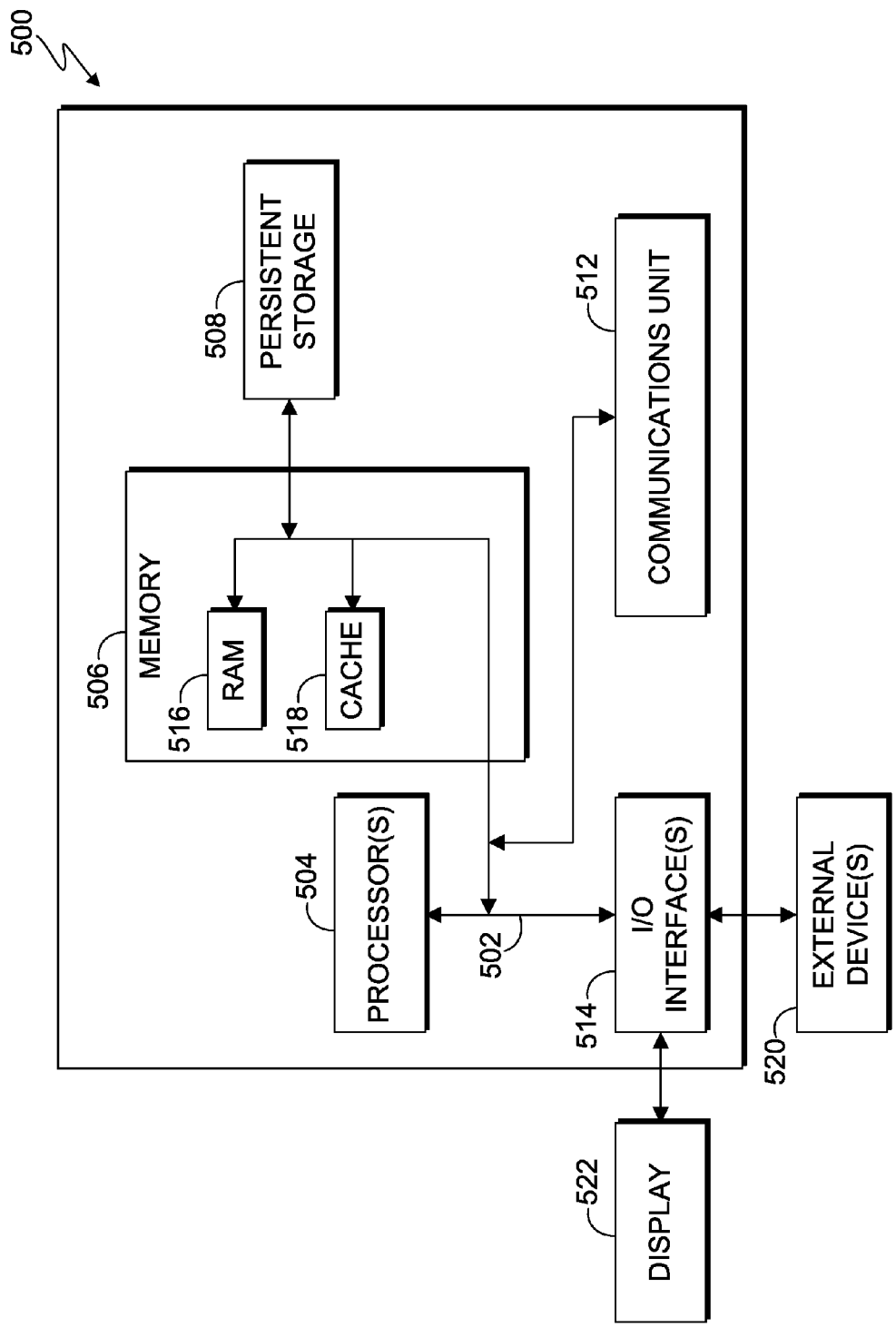
FIG. 5 is a block diagram of internal and external components of the computer systems of FIG. 1.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 120). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein. For illustrative purposes, it should be understood, RDBMS program 134 or another dedicated monitoring program can collect all necessary information and store this information in a library. Subsequently, an RDBA may request information pertinent to workloads processed by relational database managements system 132 (e.g., workloads detected, relationships, etc.) from the library.

What is claimed is:

1. A computer program product for detecting workload changes processed by a database management system, the computer program product comprising:
    one or more computer readable storage media and program instructions stored on the one or more computer readable storage media, the program instructions comprising:
    program instructions to monitor a plurality of workloads processed by the database management system in a first monitoring interval and a second monitoring interval, wherein the program instructions to monitor the plurality of workloads comprise:
        program instructions to retrieve one or more access plans for the first and the second monitoring intervals from a statement cache;
        program instructions to process the one or more access plans for the first and the second monitoring intervals to create one or more access plan hash codes, wherein the one or more access plan hash codes are hash codes of the one or more access plans for the first and the second monitoring intervals;
    program instructions to detect a change in a type of workload for a first and second monitoring interval;
    program instructions to, responsive to detecting the change in the type of workload for the first and second monitoring interval, identify the type of workload in the second monitoring interval based, at least in part, on one or more time invariant metrics; and
    program instructions to update an entry in a library to include information pertinent to the identified type of workload.

2. The computer program product of claim 1, wherein the program instructions stored on the one or more computer readable storage media further comprise:
    program instructions to retrieve access plan costs for a set of statements associated with the type of workload for the first monitoring interval from the statement cache;
    program instructions to retrieve access plan costs for a set of statements associated with the type of workload for the second monitoring interval from the statement cache;
    program instructions to estimate an overall abstract cost for the first monitoring interval using the one or more access plan costs for the first monitoring interval; and
    program instructions to estimate an overall abstract cost for the second monitoring interval using the one or more access plan costs for the second monitoring interval.

3. The computer program product of claim 2, wherein the program instructions to detect a change in a type of workload for a first and second monitoring interval comprise:
    program instructions to calculate a similarity coefficient that indicates a degree of similarity between the types of workloads in the first and second monitoring intervals;
    program instructions to determine whether the similarity coefficient satisfies a first set of conditions; and
    program instructions to, responsive to determining that the similarity coefficient satisfies the first set of conditions, detect a type of workload in the second monitoring interval, and storing the one or more access plan hash codes and the overall abstract cost associated with the detected type of workload in the second monitoring interval.

4. The computer program product of claim 3, wherein the calculated similarity coefficient is based, at least in part, on one or more access plan hash codes for the first monitoring interval and one or more access plan hash codes for the second monitoring interval.

5. The computer program product of claim 2, wherein the program instructions to detect a change in a type of workload for a first and second monitoring interval comprise:
   program instructions to calculate a similarity coefficient that indicates a degree of similarity between the types of workloads in the first and second monitoring intervals;
   program instructions to calculate a cost difference in percent that indicates a difference in percent between computational activity for the first monitoring interval and computational activity for the second monitoring interval;
   program instructions to determine whether the similarity coefficient satisfies a second set of conditions;
   program instructions to, responsive to determining that the similarity coefficient satisfies the second set of conditions, determine whether the cost difference in percent satisfies a third set of conditions; and
   program instructions to, responsive to determining that the cost difference in percent satisfies the third set of conditions, detect a type of workload in the second monitoring interval, and storing the one or more access plan hash codes and the overall abstract cost associated with the detected type of workload in the second monitoring interval.

6. The computer program product of claim 5, wherein the program instructions to, responsive to detecting the change in a type of workload for a first and second monitoring interval, identify the type of workload in the second monitoring interval comprise:
   program instructions to retrieve a previously identified type of workload, one or more access plan hash codes for the previously identified type of workload, and an overall abstract cost for the previously identified type of workload;
   program instructions to calculate a cost difference in percent using the overall abstract cost for the previously identified type of workload and using the overall abstract cost associated with the detected type of workload in the second monitoring interval;
   program instructions to calculate a similarity coefficient for the previously identified type of workload and the detected type of workload in the second monitoring interval;
   program instructions to determine whether the similarity coefficient for the previously identified type of workload and the detected type of workload in the second monitoring interval satisfies a fourth set of conditions;
   program instructions to determine whether the calculated cost difference in percent satisfies a fifth set of conditions;
   program instructions to, responsive to determining that the similarity coefficient for the previously identified type of workload and the detected type of workload in the second monitoring interval satisfies the fourth set of conditions, and the calculated cost difference in percent for the previously identified type of workload and the detected type of workload in the second monitoring interval satisfies the fifth set of conditions, identify the detected type of workload in the second monitoring interval;
   program instructions to determine whether the cost difference in percent for the previously identified type of workload and the detected type of workload in the second monitoring interval satisfies a sixth set of conditions; and
   program instructions to, responsive to determining that the cost difference in percent for the previously identified type of workload and the detected type of workload in the second monitoring interval satisfies the sixth set of conditions, determine an increase or a decrease in computational activity between computational activity for the previously identified type of workload and computational activity for the identified type of workload.

7. A computer system for detecting workload changes processed by a database management system, the computer system comprising:
   one or more computer processors;
   one or more computer readable storage media;
   program instructions stored on the computer readable media for execution by at least one of the one or more processors, the program instructions comprising:
   program instructions to monitor a plurality of workloads processed by the database management system in a first monitoring interval and a second monitoring interval, wherein the program instructions to monitor the plurality of workloads comprise:
      program instructions to retrieve one or more access plans for the first and the second monitoring intervals from a statement cache;
      program instructions to process the one or more access plans for the first and the second monitoring intervals to create one or more access plan hash codes, wherein the one or more access plan hash codes are hash codes of the one or more access plans for the first and the second monitoring intervals;
   program instructions to detect a change in a type of workload for a first and second monitoring interval;
   program instructions to, responsive to detecting the change in the type of workload for the first and second monitoring interval, identify the type of workload in the second monitoring interval based, at least in part, on one or more time invariant metrics; and
   program instructions to update an entry in a library to include information pertinent to the identified type of workload.

8. The computer system of claim 7, wherein the program instructions stored on the one or more computer readable storage media further comprise:
   program instructions to retrieve access plan costs for a set of statements associated with the type of workload for the first monitoring interval from the statement cache;
   program instructions to retrieve access plan costs for a set of statements associated with the type of workload for the second monitoring interval from the statement cache;
   program instructions to estimate an overall abstract cost for the first monitoring interval using the one or more access plan costs for the first monitoring interval; and
   program instructions to estimate an overall abstract cost for the second monitoring interval using the one or more access plan costs for the second monitoring interval.

9. The computer system of claim 8, wherein the program instructions to detect a change in a type of workload for a first and second monitoring interval comprise:
  program instructions to calculate a similarity coefficient that indicates a degree of similarity between the types of workloads in the first and second monitoring intervals;
  program instructions to determine whether the similarity coefficient satisfies a first set of conditions; and
  program instructions to, responsive to determining that the similarity coefficient satisfies the first set of conditions, detect a type of workload in the second monitoring interval, and storing the one or more access plan hash codes and the overall abstract cost associated with the detected type of workload in the second monitoring interval.

10. The computer system of claim 8, wherein the program instructions to detect a change in a type of workload for a first and second monitoring interval comprise:
  program instructions to calculate a similarity coefficient that indicates a degree of similarity between the types of workloads in the first and second monitoring intervals;
  program instructions to calculate a cost difference in percent that indicates a difference in percent between computational activity for the first monitoring interval and computational activity for the second monitoring interval;
  program instructions to determine whether the similarity coefficient satisfies a second set of conditions;
  program instructions to, responsive to determining that the similarity coefficient satisfies the second set of conditions, determine whether the cost difference in percent satisfies a third set of conditions; and
  program instructions to, responsive to determining that the cost difference in percent satisfies the third set of conditions, detect a type of workload in the second monitoring interval, and storing the one or more access plan hash codes and the overall abstract cost associated with the detected type of workload in the second monitoring interval.

11. The computer system of claim 10, wherein the program instructions to, responsive to detecting the change in a type of workload for a first and second monitoring interval, identify the type of workload in the second monitoring interval comprise:
  program instructions to retrieve a previously identified type of workload, one or more access plan hash codes for the previously identified type of workload, and an overall abstract cost for the previously identified type of workload;
  program instructions to calculate a cost difference in percent using the overall abstract cost for the previously identified type of workload and using the overall abstract cost associated with the detected type of workload in the second monitoring interval;
  program instructions to calculate a similarity coefficient for the previously identified type of workload and the detected type of workload in the second monitoring interval;
  program instructions to determine whether the similarity coefficient for the previously identified type of workload and the detected type of workload in the second monitoring interval satisfies a fourth set of conditions;
  program instructions to determine whether the calculated cost difference in percent satisfies a fifth set of conditions;
  program instructions to, responsive to determining that the similarity coefficient for the previously identified type of workload and the detected type of workload in the second monitoring interval satisfies the fourth set of conditions, and the calculated cost difference in percent for the previously identified type of workload and the detected type of workload in the second monitoring interval satisfies the fifth set of conditions, identify the detected type of workload in the second monitoring interval;
  program instructions to determine whether the cost difference in percent for the previously identified type of workload and the detected type of workload in the second monitoring interval satisfies a sixth set of conditions; and
  program instructions to, responsive to determining that the cost difference in percent for the previously identified type of workload and the detected type of workload in the second monitoring interval satisfies the sixth set of conditions, determine an increase or a decrease in computational activity between computational activity for the previously identified type of workload and computational activity for the identified type of workload.

* * * * *